(12) United States Patent
Dowd et al.

(10) Patent No.: US 6,322,083 B1
(45) Date of Patent: Nov. 27, 2001

(54) INSULATING GASKET

(75) Inventors: David Dowd, North Syracuse; Nicholas Hayduke, Marcellus, both of NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 09/419,021

(22) Filed: Oct. 15, 1999

(51) Int. Cl.[7] .................................................. F16J 15/14
(52) U.S. Cl. ...................... 277/590; 277/917; 277/628; 277/630
(58) Field of Search .................... 277/917, 628, 277/630, 650, 944, 919, 920; 174/35 GC, 55, 52.3

(56) References Cited

U.S. PATENT DOCUMENTS

| | | | | |
|---|---|---|---|---|
| 4,265,365 | * | 5/1981 | Boteler | 220/3.3 |
| 4,385,504 | * | 5/1983 | Perrone et al. | 62/259.1 |
| 4,484,021 | * | 11/1984 | Schaefer | 174/53 |
| 4,690,413 | * | 9/1987 | Adkins | 277/199 |
| 4,794,207 | * | 12/1988 | Norberg | 174/48 |
| 4,803,307 | * | 2/1989 | Shotey | 174/67 |
| 5,003,130 | * | 3/1991 | Danforth et al. | 174/153 |
| 5,433,455 | * | 7/1995 | Nelson | 277/199 |
| 5,449,860 | * | 9/1995 | Buckshaw | 174/67 |
| 5,626,346 | * | 5/1997 | Gavin | 277/9.5 |
| 5,882,014 | * | 3/1999 | Gavin | 277/602 |
| 6,075,205 | * | 6/2000 | Zhang | 174/35 |

* cited by examiner

Primary Examiner—Anthony Knight
Assistant Examiner—Matthew E. Rodgers
(74) Attorney, Agent, or Firm—Wall Marjama & Bilinski LLP

(57) ABSTRACT

An insulating gasket for preventing drafts from passing through a wall at the location of an electrical fixture. The gasket which has a plurality of overlapping removable cut-outs, such that the same gasket may engage with different fixtures depending on the area which is cut out. It also has removable side strips to allow it to fit in any position in a multi-gang fixture.

33 Claims, 6 Drawing Sheets

INSULATING GASKET

FIELD OF THE INVENTION

This invention relates generally to an insulating gasket for preventing drafts from passing through a wall at the location of an electrical fixture. In particular, it relates to a gasket which has a plurality of overlapping removable cut-outs, such that the same gasket may fit different fixtures depending on which cut-outs are removed.

BACKGROUND OF THE INVENTION

Electrical fixtures such as outlets and switches are commonly placed in walls, where they are hard-wired within junction boxes to connect them to an electrical supply network. For safety and decorative reasons, the junction boxes are covered with cover plates, which have openings to permit the exposure of only those parts of a fixture to which everyday access is necessary. Typically, a cover plate opening is sized and shaped to receive a particular fixture, such as a duplex outlet fixture, a toggle switch, or a decorator switch. Most commonly, a duplex outlet requires one configuration of opening, a toggle switch requires another configuration, and decorator switch requires yet another configuration. Duplex outlets are provided in pairs, one above the other at a standard distance apart, and the cover plate for a duplex fixture accordingly has two openings, one for each outlet.

Frequently, electrical requirements are such that it is necessary to provide multiple switches, or outlets, or both at a particular location. For such cases, junction boxes are appropriately sized to accommodate the required number of fixtures. Such boxes most commonly provide for multiple fixtures to be disposed in a single, horizontal row of perhaps two, three or four. Such arrangements are referred to as double-ganging, triple-ganging and so on, depending on the number of fixtures; in fact, a single fixture can be referred by the term of single-ganging. Most commonly, a multiple ganging situation has a plurality of switches, perhaps with one duplex outlet. The separation of adjacent fixtures in a multiple ganging situation is normally governed by industry standards, and thus standard cover plates are available to correspond to the most common combinations. In addition to the fixture openings, cover plates also have screw holes which allow them to be screwed to threaded receiving holes in a fixture or fixtures in the junction box. Industry standards provide for correct alignment between the screw holes and the receiving holes.

It frequently happens that in a finished electrical installation, there is sufficient air space in a junction box and a nearby wall to allow drafts to pass into a room. Frequently, the clearances between the cover plate and the fixture, and the cover plate and the wall, are not tight enough to provide a good seal against these drafts. Particularly in a cold climate, these drafts can be a source of expense and environmental degradation because of wasted energy, as well as being a source of discomfort and perhaps aggravation.

Various strategies can be employed to impede the passage of wind currents through a junction box. These can include the use of caulking or gaskets to seal against air passage. Caulking is undesirable since it inhibits subsequent removal of the cover plate should subsequent work be necessary; it may also necessitate some repair and repainting of the wall before the cover plate is put back in place. Because of the aforementioned variety of apertures needed to conform to different outlets, switches and combinations thereof, it can be appreciated that while a different gasket can be made for each situation, there is a need to provide a single pattern of gasket which be used in every or many situations.

It is therefore an object of this invention to provide an insulating and impervious gasket which can be configured to conform with an electrical fixture selected from a plurality of fixtures.

It is further an object of the invention to provide an insulating and impervious gasket which can be configured to conform to a selected electrical fixture disposed at any position in a multi-gang assembly.

The present invention addresses the aforementioned need, representing a great advantage to the manufacturer and a significant saving to the customer.

SUMMARY OF THE INVENTION

This invention relates to an insulating gasket for installation between a cover plate and an electrical junction box at a recess in a wall. The gasket is intended to increase the energy efficiency of electrical device installations such as switch boxes and outlet boxes. The gasket is installed after the installation of a device and before the cover plate is applied. The gasket is preferably made of an elastomeric foam rubber or plastic which creates an insulating barrier between the cover plate and the recess wherein the box is located, blocking the flow of air and moisture. This eliminates cool, damp drafts from entering a building through the recess in the wall.

The gasket is pre-cut with the overlapping, removable shapes of a duplex fixture, a toggle switch and a decorator switch, so that any shape can be removed to provide the appropriate aperture for a given fixture. One gasket can be used for any fixture, simply by removing the appropriate shape. Preferably, each aperture is slightly undersized relative to the part of the fixture with which the gasket is engaged. This provides a snug fit and allows the gasket to remain in place without being manually held while the cover plate is being installed. The pre-cut shapes corresponding to different fixtures have portions in common. In other words, the pre-cut areas overlap and a given portion of the gasket may be removed in providing the apertures for different fixtures.

The gasket is also pre-cut down both sides to allow the optional removal of a strip of material at either side. This allows a given gasket to be accommodated anywhere in a multi-gang installation, either at the left outside position, the right outside position, or an interior position, depending on which strip or strips are removed; the insulation for a multi-gang assembly is simply provided by using a suitable combination of appropriately configured gaskets.

DETAILED DESCRIPTION OF THE INVENTION

Figure 1:
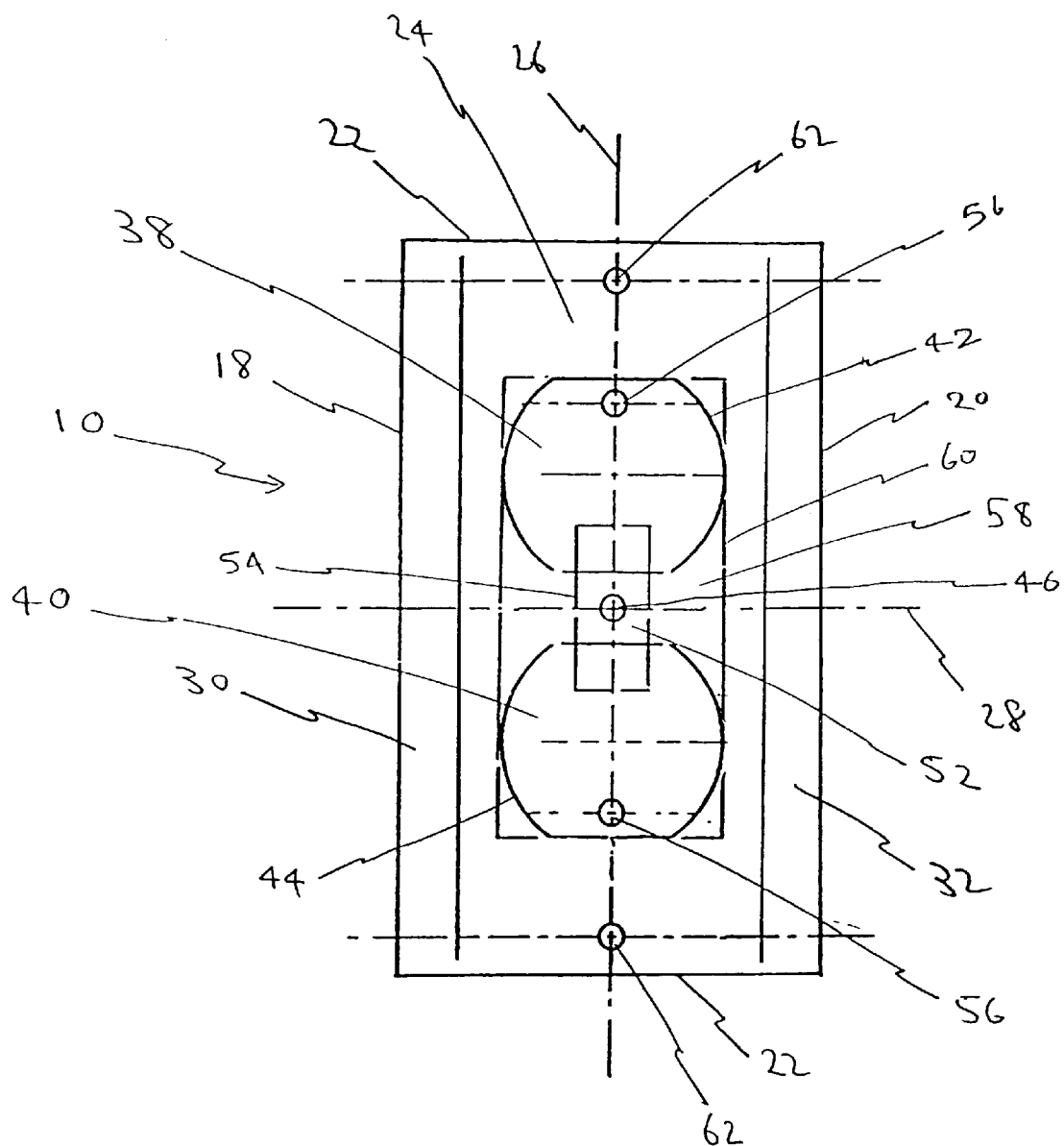
FIG. 1 is a plan view of a gasket of the invention.

Referring now to the drawings, a rectangular gasket 10 is shown for placing between a cover plate 12 and a fixture junction box 14 in a wall 16. The gasket can be selectably modified to provide apertures which engage with any one of a plurality of electrical fixtures, for which purpose it has selectably removable, preferably overlapping, corresponding areas, or "cut-outs", which will be identified and described further. The aperture cut-outs are bounded by appropriate lines of weakness, such as incomplete incisions. In other words, the incisions do not entirely sever the cut-outs which they bound, so preserving attachment points between the cut-outs and adjoining areas of the gasket. An incision may follow the entire perimeter of a given cut-out without completely penetrating the depth of the gasket, or it may penetrate the entire depth of the gasket without following the entire perimeter of the cut-out. The requirement is that attachment points are strong enough to hold the cut-outs in place until their removal is desired, but weak enough to permit their easy removal such that a resulting aperture has a well-defined boundary. Not all attachment points are obvious in the drawings, but it will suffice to indicate specific examples. It will be understood, however, that every aperture cut-out has an attachment point until it is intentionally severed.

In addition to aperture cut-outs which provide for the gasket to engage directly with a fixture, the gasket also has minor cut-outs for holes through which cover plate fasteners can pass.

The gasket 10 has a longitudinal left-hand edge 18 and right-hand edge 20, two transverse edges 22, and a central area 24 which is bisected by a longitudinal axis 26 and a transverse axis 28. The gasket 10 is typically formed from a 0.125" thick sheet of porous elastomeric material, which has the appearance and flexibility of a conventional foam rubber, of which many examples are known. A polyethylene material with closed porosity is preferred, such as is sold under the brand name Voltex Volara. Any similar material can be used subject to meeting safety codes, particularly with respect to flammability. The gasket normally has dimensions of 4.25"×2.5", to best conform with standard box dimensions.

Along each longitudinal edge 18 and 20 are removable strips of material, a left-hand strip 30 and a right-hand strip 32 bounded respectively by lines of weakness and 34 and 36, which also bound the central area 24. As with the cut-outs, the lines of weakness are incomplete incisions. They may penetrate the entire depth of the gasket but stop a little short of reaching the transverse edges 22, or they may extend along the entire length of the gasket without penetrating its entire depth.

Figure 2:
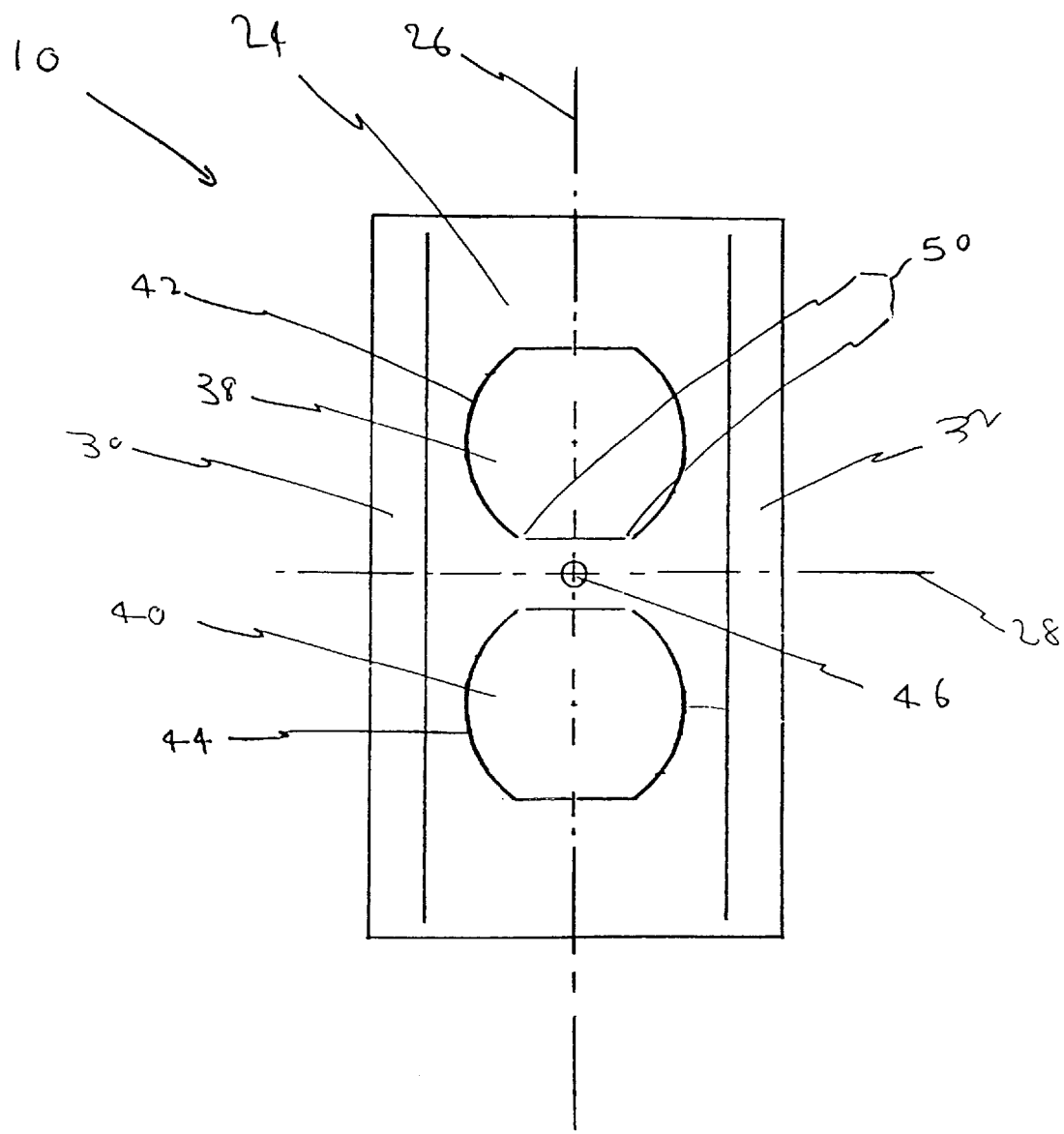
FIGS. 2, 3 and 4 are simplified plan views of the gasket, showing individual features of the gasket.
Figure 3:
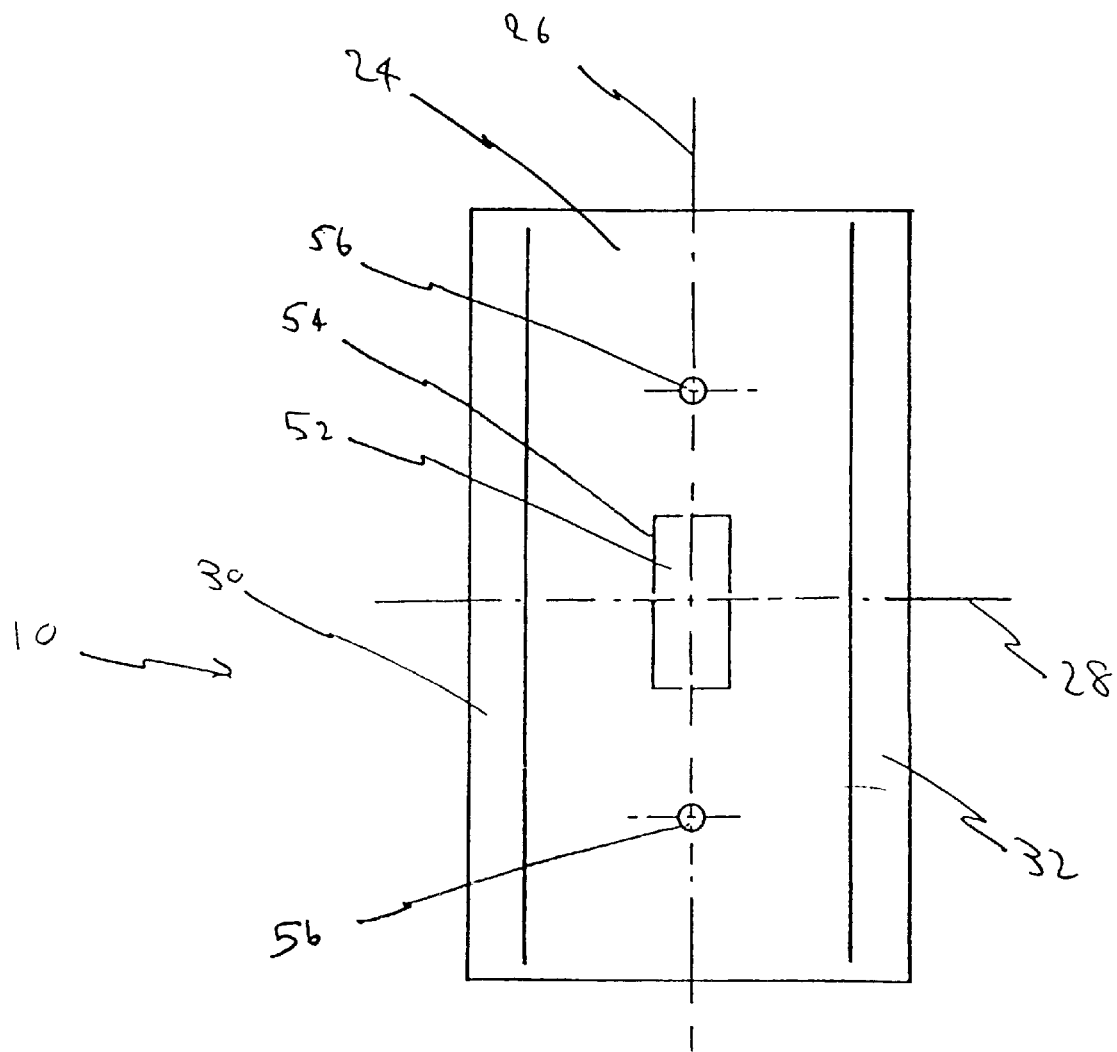
Figure 4:
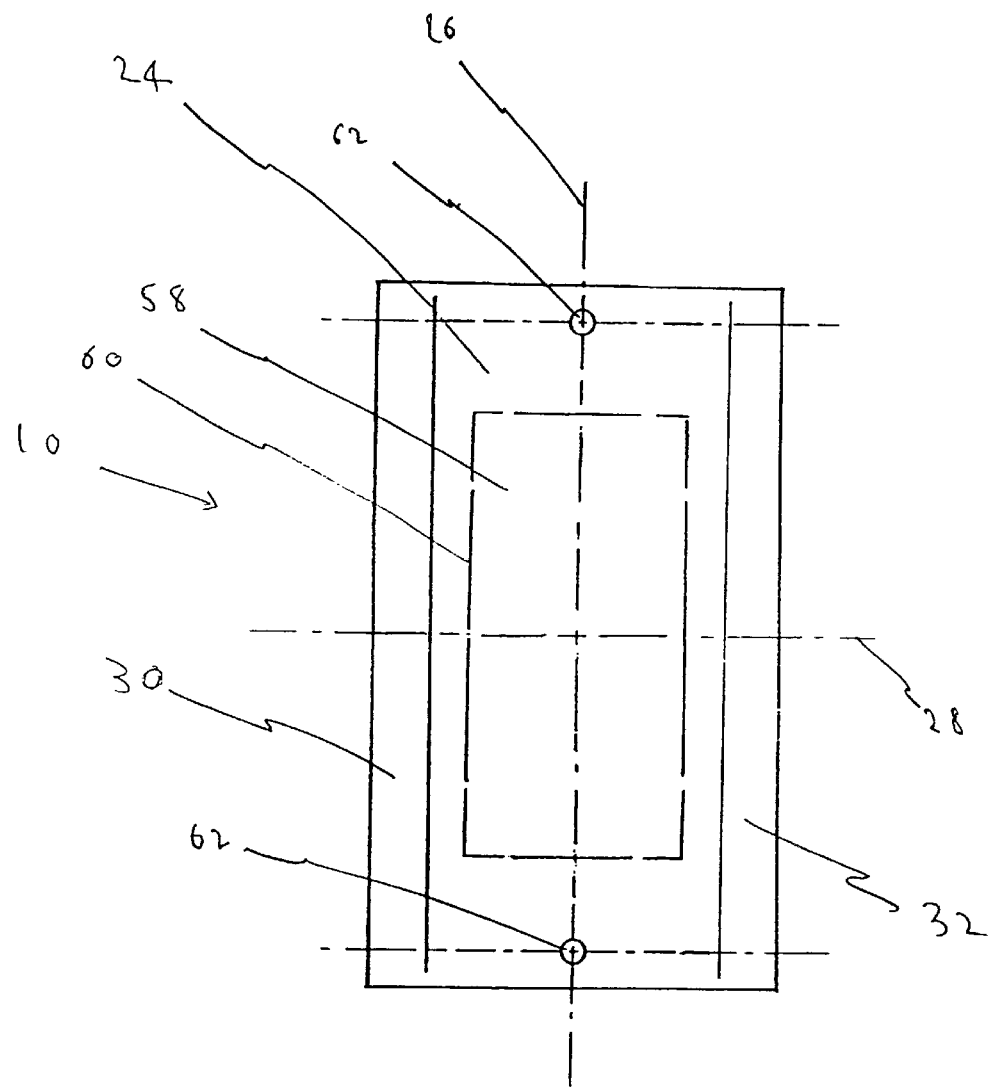

FIG. 1 shows the gasket 10 of the invention, while FIGS. 2, 3 and 4 have simplified plan views of the gasket 10, to clearly distinguish the cut-outs which conform separately to each of three different electrical fixtures. Identical features are labelled identically in all while FIGS. 1, 2, 3 and 4. The cut-outs and strips are symmetrically disposed about the longitudinal axis 26.

In FIG. 2, the gasket 10 is shown with only the cut-outs for a duplex electrical outlet fixture. An upper cut-out 38 and a lower cut-out 40 are bounded by incisions 42 and 44 respectively, and are removable to form apertures to engage with the two outlets. The minor cut-out 46 is removable to form a fastener hole, through which an attachment screw 48 can pass when the cover plate 12 is attached to the junction box 14. Each of the duplex incisions 42 and 44 has a linear horizontal upper and lower portion, and two arcuate side portions to conform with the most common shape of a duplex outlet. In order to provide for attachment points, the duplex incisions 42 and 44 are not continuous; for example, the upper cut-out 38 has the attachment points 50.

In FIG. 3, the gasket 10 is shown with only the cut-outs for a toggle switch. A longitudinally disposed rectangular cut-out 52 is bounded by an incision 54, and is removable to form an aperture for the switch, while the minor cut-outs 56 are removable to form fastener holes for attachment screws 48. Structurally, the same cut-outs would be compatible with a dimmer switch, which will be henceforward understood to be included in any reference to a toggle switch.

In FIG. 4, the gasket 10 is shown with only the cut-outs for a decorator switch. A longitudinally disposed rectangular cut-out 58 is bounded by an incision 60, and is removable to form an aperture for the decorator switch, while the minor cut-outs 62 are removable to form fastener holes for attachment screws 48.

Returning now to FIG. 1, this shows the gasket 10 of the invention with features in combination which are shown individually in FIGS. 2, 3 and 4. Portions of the area of the gasket in FIG. 1 are shared in common by different cut-outs, and portions of the incisions for different cut-outs are either shared or intersect. The aperture cut-outs in gasket 10 when removed form apertures that are slightly undersized relative to the fixtures with which the gasket is intended to engage.

The decorator switch cut-out 58 embraces the entire area of the duplex cut-outs 38 and 40, the toggle switch cut-out 52, the minor duplex cut-out 46, and the minor toggle-switch cut-outs 56.

The toggle switch cut-out 52 overlaps with both duplex outlet cut-outs 38 and 40 just above and just below the transverse axis 28. Each of the duplex cut-outs 38 and 40 encloses a minor toggle-switch cut-out 56. The toggle-switch cut-out 52 encloses the minor duplex cut-out 46.

Among the cut-outs, the only ones which do not overlap with other cut-outs are the minor decorator switch cut-outs 62.

The decorator-switch incision 60 coincides with the uppermost portion of upper duplex incision 42, the lowest portion of duplex incision 44, and tangentially approaches the arcuate portions of both duplex incisions 42 and 44.

The toggle switch incision 54 has two longitudinal portions, both of which orthogonally intersect the lowest portion of the upper duplex incision 42 and the uppermost portion of the lower duplex incision 44.

It will be appreciated that the gasket of the invention allows one to remove all of the material necessary to accommodate a given fixture, and only that material. For example, when conforming the gasket 10 to a toggle switch, only the corresponding toggle switch cut-out 52 and minor cut-outs 56 are removed. In the removal of toggle switch cut-out 52, the minor duplex cut-out 46 is necessarily removed because it is completely enclosed by the toggle switch cut-out 52. However, only those portions of the duplex cut-outs 38 and 40 which are shared with the toggle-switch cut-out 52 are removed. Similarly, in conforming the gasket 10 to a duplex outlet, the duplex cut-outs 38 and 40, and the minor duplex cut-out 46 are removed. Finally, for a decorator switch, the decorator switch cut-out 58 is removed, which happens also to embrace the toggle switch cut-out 52, both duplex cut-outs 38 and 40, and of course the respective minor cut-outs 46 and 52. The minor decorator switch cut-outs 62 are separately removed.

Returning now to the strips of material 30 and 32 in FIG. 1, these are optionally removable depending upon the nature of the electrical installation. In a single-gang installation, the strips 30 and 32 are left intact. Once a single gasket conforms to the installed fixture, it suffices for use without further modification. In a multi-gang installation, multiple fixtures are normally located together in a single horizontal row. and an appropriate gasket is required for each fixture. The dimensional standards are such that the fixtures are spaced apart by a lesser distance than could accommodate the entire width of the gasket 10, and the strips 30 and 32 are provided to allow for this. A gasket for a left outside position would have the right-hand strip 32 removed, leaving the left-hand strip 30 and the central area 24. Similarly, a right outside gasket would have the left hand strip 30 removed to leave the right-hand strip 32 and the central area 24. When three or more fixtures are ganged together, there is always an interior position, and a gasket for such a position would have both strips 30 and 32 removed, leaving only the central area 24. In short, the gasket 10 of the invention can be used in a multi-gang situation, one gasket corresponding to each fixture. By the removal of one or both strips 30 and 32 as necessary, the gaskets 10 can be sized to closely abut, leaving no significant gap between them. To accord with the size requirement, each removable strip is normally about 0.33" wide.

Figure 5:
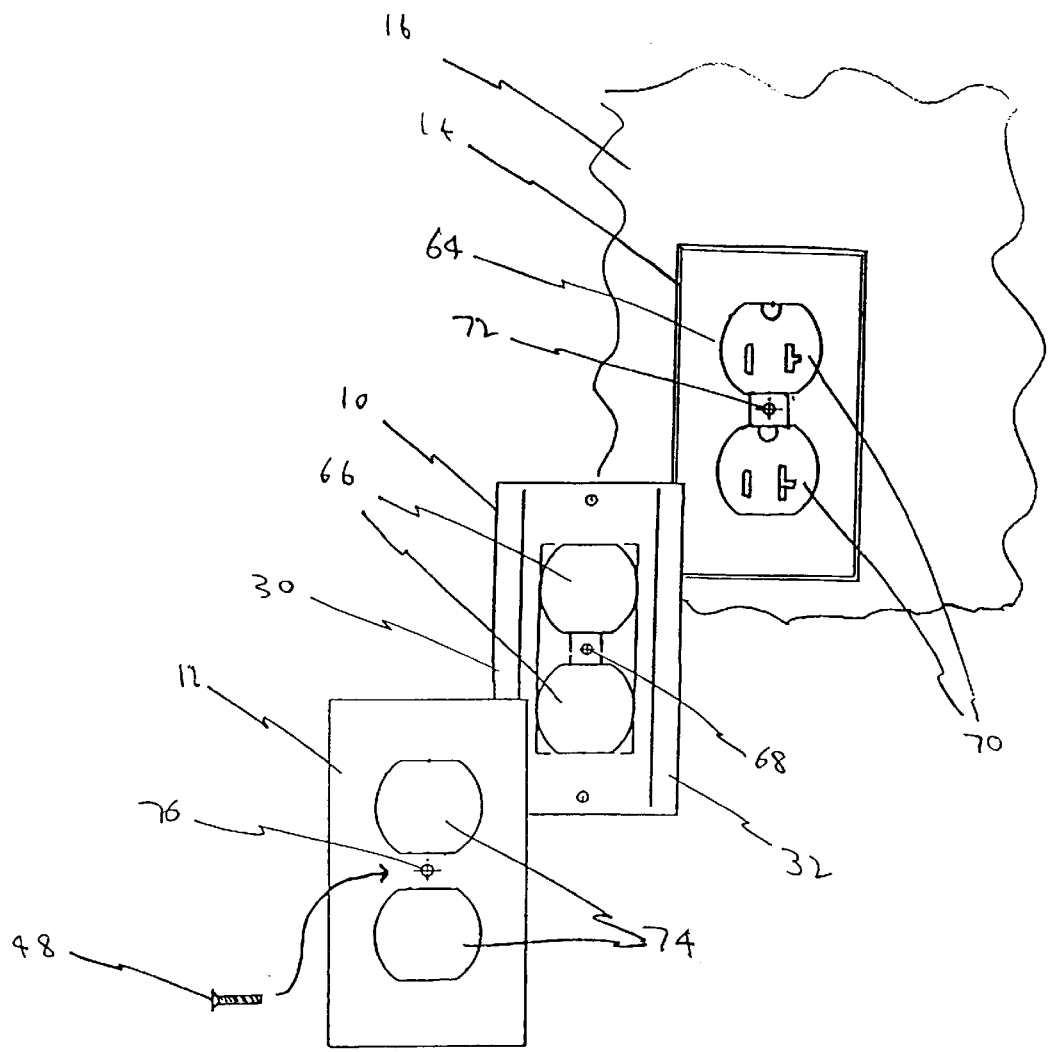
FIG. 5 is a partially overlaid plan view of a wall, a single-gang junction box showing a simplified electrical fixture, the gasket and a cover plate, and also has a side view of a fastening screw.

Assuming an electrical installation is in place and ready to accept a cover plate, a gasket is installed as best shown in FIG. 5 for the example of a single-gang duplex outlet fixture 64. The duplex aperture cut-outs 38 and 40 and the minor cut-out 46 are removed to create new apertures 66 and a fastener hole 68. The apertures 66 are engaged with outlet members 70 of the duplex fixture 64. The apertures 66 being slightly undersized, and the gasket material being sufficiently flexible, the gasket 10 fits snugly around outlet members 70, the hole 68 being aligned with a corresponding fastener receiving hole 72 in the fixture 64. Such a close fit holds the gasket in place without further manual assistance, allowing the cover plate 12 to be affixed. All that remains is to align the cover plate 12 until duplex openings 74 in the cover plate engage with the outlet members 70. The receiving hole 72, the fastener hole 68 and a cover plate screw hole 76 are correspondingly aligned to admit the screw 48 which is tightened to affix the cover plate 12 to the fixture. The procedures for fixtures other than the duplex outlet are entirely analogous and require no additional description.

Figure 6:
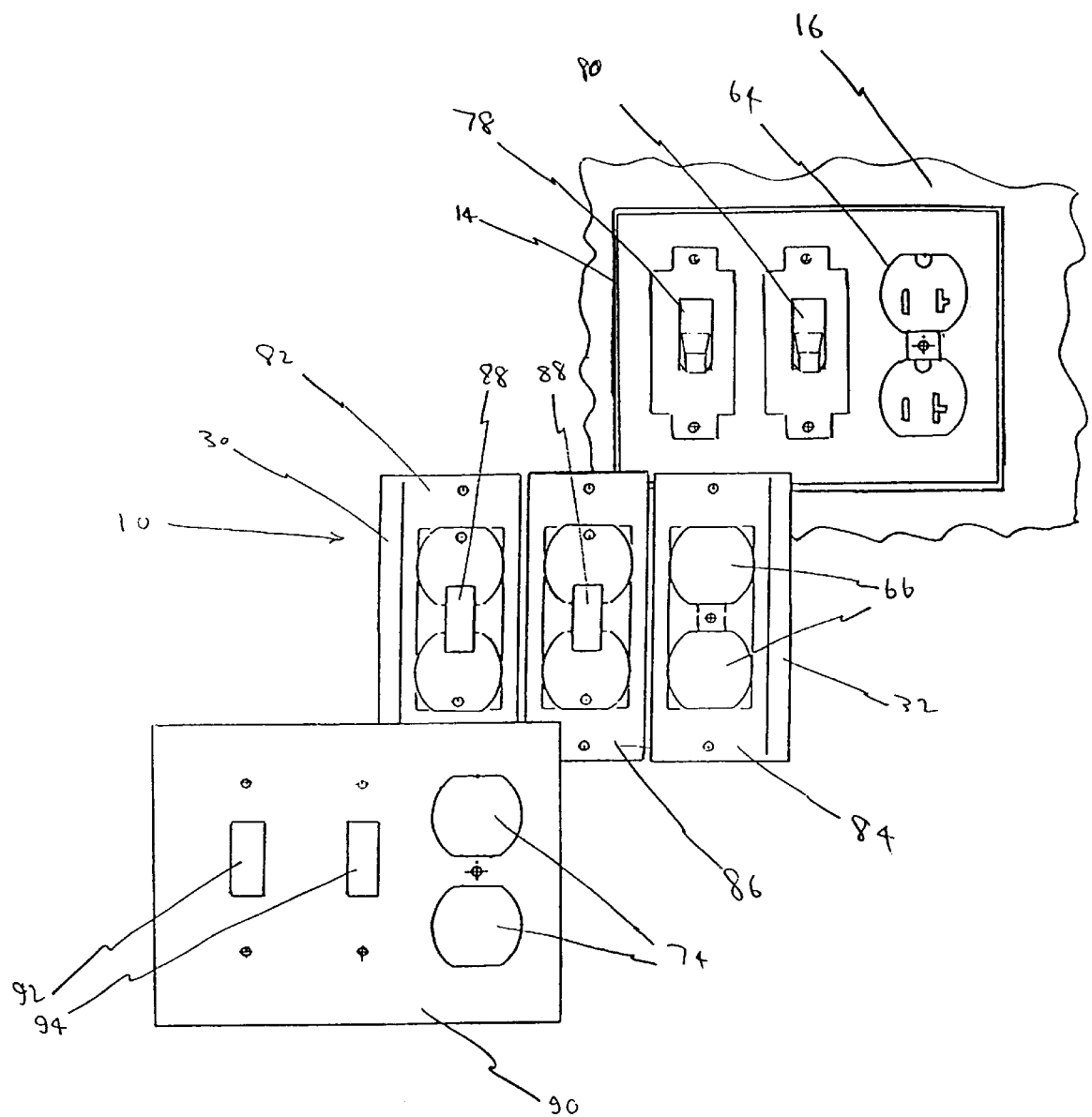
FIG. 6 shows a view of a triple-gang junction box showing three simplified electrical fixtures, three gaskets and a cover plate in a manner analogous to FIG. 5 but omitting the fastening screw.

For multi-ganged installations, the procedure is generally similar. However, for each gasket, an additional step of removing either or both of the strips 30 and 32 is necessary. Conventional multi-gang installations have a left outside position, a right outside position and, when three or more fixtures are present, one or more inside positions. FIG. 6 shows an example of a triple-gang installation with a left outside toggle switch 78, an inner toggle switch 80 and a right outside duplex outlet 64. The gaskets 10 are correctly sized by removing the right-hand strip 32 of a left outside gasket 82, the left-hand strip 30 of a right-outside gasket, 84 and both strips 30 and 32 any interior gasket such as 86. In the example of FIG. 6, the right outside gasket 84 has duplex apertures 66, just as in the aforementioned single-gang example of FIG. 5. The left outside gasket 82 and the interior gasket 86 of the FIG. 6 example are for toggle switches, and the cut-outs 52 are therefore removed to provide apertures 88. The gaskets 10 are engaged with their corresponding fixtures, and aligned with corresponding fastener receiving holes just as for the single-gang installation. A triple cover plate 90 matches the entire assembly, having right outside duplex openings 74 and a left outside and an interior toggle switch opening, 92 and 94 respectively. The triple-gang cover plate 90 is installed similarly to the single-gang cover plate 12.

No holes or apertures remain in a given gasket other than those necessary for the corresponding fixture. Furthermore, in multi-gang installations, adjacent gaskets are sized to abut closely enough to minimize air gaps. Therefore, the desirable object of sealing and insulating all of the most conventional configurations of electrical installation is achieved with the gasket of this invention.

While the invention has been described in connection with a presently preferred embodiment thereof, those skilled in the art will recognize that certain modifications and changes may be made therein without departing from the true spirit and scope of the invention, which accordingly is intended to be defined solely by the appended claims.

We claim:

1. A gasket for placing between an electrical fixture cover plate and a junction box in a wall, the gasket having:
    (a) a plurality intersecting aperture pre-cut shapes which may selectably be removed to provide an aperture whereat the gasket can engage with a member of a fixture which is selected from a plurality of fixtures; and
    (b) a minor pre-cut shape which may be selectably removed to provide a fastener hole corresponding to the selected fixture.

2. The gasket of claim 1, wherein each of the aperture pre-cut shapes has an attachment point with an adjoining area of the gasket.

3. The gasket of claim 1 wherein the plurality of fixtures includes a duplex outlet, a toggle switch, a dimmer switch and a decorator switch.

4. The gasket of claim 1, further having removable pre-cut strips which may be selectably removed to conform the gasket so that it fits one of an exterior and an interior position of a multi-ganged installation.

5. The gasket of claim 4, wherein each of the removable strips has an attachment point with a central area of the gasket.

6. The gasket of claim 1 wherein the aperture is slightly undersized relative to the fixture member, the gasket being made of material sufficiently flexible such that the gasket can engage snugly with the fixture member.

7. The gasket of claim 6, the material further being thermally insulating and impervious to a fluid.

8. The gasket of claim 6, the material being a porous elastomer.

9. The gasket of claim 8, wherein the porous elastomer has closed porosity.

10. The gasket of claim 8, wherein the elastomer is polyethylene.

11. An electrical installation having a junction box, an electrical fixture in the junction box, a cover plate for the junction box, and a gasket which can be interposed between the junction box and the cover plate, the fixture being selected from a plurality of fixtures, and the gasket having:
    (a) a rectangular shape with a left-hand edge, a right-hand edge and two transverse edges;
    (b) a plurality of intersecting aperture pre-cut shapes which may selectably be removed to provide an aperture whereat the gasket can engage with the selected fixture; and
    (c) a minor pre-cut shape which may be selectably removed to provide a fastener hole corresponding to the selected fixture.

12. A gasket for placing between an electrical fixture cover plate and a junction box in a wall, the gasket having:
    (a) an aperture cut-out which may be removed to provide an aperture whereat the gasket can engage with the fixture;

(b) a minor cut-out which may be removed to provide a fastener hole corresponding to the fixture; and (c) removable pre-cut strips along each longitudinal edge which may be selectably removed to conform the gasket so that it fits one of an exterior and an interior position of a multi-ganged installation.

13. The gasket of claim 12, wherein each of the removable strips has an attachment point with a central area of the gasket.

14. A gasket for placing between an electrical fixture cover plate and a junction box in a wall, the gasket having:

(a) an aperture whereat the gasket can engage with the fixture;

(b) a fastener hole corresponding to the fixture; and (c) removable pre-cut strips along each longitudinal edge which may be selectably removed to conform the gasket so that it fits one of an exterior and an interior position of a multi-ganged installation.

15. The gasket of claim 14, wherein each of the removable strips has an attachment point with a central area of the gasket.

16. A gasket for placing between an electrical fixture cover plate and a junction box in a wall, the gasket having:

(a) a rectangular shape with a left-hand edge, a right-hand edge and two transverse edges;

(b) an aperture cut-out which may be removed to provide an aperture shaped to engage with the fixture;

(c) a minor cut-out which may be removed to provide a fastener hole corresponding to the fixture;

(d) a removable strip along each longitudinal edge;

(e) an incision between each removable strip and a central area of the gasket; and (f) an attachment point between the removable strip and the central area of the gasket;

so that the removable strip may be optionally removed to allow the gasket to fit in one of a left-hand exterior position, a right hand exterior position and an interior position of a multi-gang installation.

17. The gasket of claim 16, wherein the width of the removable strip is such that when it is removed, the gasket is appropriately sized to closely abut a second gasket in a multi ganged installation, the second gasket also being appropriately sized, each gasket being properly engaged with its corresponding fixture.

18. A gasket for placing between an electrical fixture cover plate and a junction box in a wall, the gasket having:

(a) a rectangular shape with a left-hand edge, a right-hand edge and two transverse edges;

(b) an aperture shaped to engage with the fixture;

(c) a fastener hole corresponding to the fixture;

(d) a removable strip along each longitudinal edge;

(e) an incision between each removable strip and a central area of the gasket; and (f) an attachment point between the removable strip and the central area of the gasket;

so that the removable strip may be optionally removed to allow the gasket to fit in one of a left-hand exterior position, a right hand exterior position and an interior position of a multi-gang installation.

19. The gasket of claim 18, wherein the width of the removable strip is such that when it is removed, the gasket is appropriately sized to closely abut a second gasket in a multi ganged installation, the second gasket also being appropriately sized, each gasket being properly engaged with its corresponding fixture.

20. An electrical installation having a multi gang junction box, an electrical fixture in the junction box, a cover plate for the junction box, and a gasket which can be interposed between the junction box and the cover plate, the gasket having:

(a) a rectangular shape with a left-hand edge, a right-hand edge and two transverse edges;

(b) an aperture cut-out which may be removed to provide an aperture shaped to engage with the fixture;

(c) a minor cut-out which may be removed to provide a fastener hole corresponding to the fixture;

(d) a removable strip along each longitudinal edge;

(e) an incision between each removable strip and a central area of the gasket; and (f) an attachment point between the removable strip and the central area of the gasket;

the left-hand strip being removable and having a width which, after the strip is removed, sizes the gasket to properly engage with the fixture and to closely abut at its left a second gasket which is properly engaged with a second fixture, when the second gasket has a corresponding right-hand strip removed.

21. The installation of claim 20, wherein the first and second gaskets both occupy exterior positions.

22. The installation of claim 20, wherein one of the gaskets occupies an interior position, its opposite strip being removable to allow the gasket to closely abut a third gasket which is sized to properly engage a third fixture.

23. An electrical installation having a multi gang junction box, an electrical fixture in the junction box, a cover plate for the junction box, and a gasket which can be interposed between the junction box and the cover plate, the gasket having:

(a) a rectangular shape with a left-hand edge, a right-hand edge and two transverse edges;

(b) an aperture shaped to engage with the fixture;

(c) a fastener hole corresponding to the fixture;

(d) a removable strip along each longitudinal edge;

(e) an incision between each removable strip and a central area of the gasket; and (f) an attachment point between the removable strip and the central area of the gasket;

the left-hand strip being removable and having a width which, after the strip is removed, sizes the gasket to properly engage with the fixture and to closely abut at its left a second gasket which is properly engaged with a second fixture, when the second gasket has a corresponding right-hand strip removed.

24. The installation of claim 23, wherein the first and second gaskets both occupy exterior positions.

25. The installation of claim 23, wherein one of the gaskets occupies an interior position, its opposite strip being removable to allow the gasket to closely abut a third gasket which is sized to properly engage a third fixture.

26. An electrical installation having a multi-gang junction box, an electrical fixture in the junction box, a cover plate for the junction box, and a gasket which can be interposed between the junction box and the cover plate, the fixture being selected from a plurality of fixtures, and the gasket having:

(a) a rectangular shape with a left-hand edge, a right-hand edge and two transverse edges;

(b) a plurality of overlapping aperture cut-outs which may selectably be removed to provide an aperture whereat the gasket can engage with a member of the selected fixture;

(c) a minor cut-out which may be selectably removed to provide a fastener hole corresponding to the selected fixture;

(d) a removable strip along each longitudinal edge;

(e) an incision between each removable strip and a central area of the gasket; and (f) an attachment point between the removable strip and the central area of the gasket;

the left-hand strip having a width which, after the strip is removed, sizes the gasket to properly engage with the selected fixture and to closely abut at its left a second gasket which is properly engaged with a second selected fixture, provided that the second gasket has a corresponding right-hand strip removed, and that each gasket has the appropriate cut-outs removed to allow it to engage with its corresponding fixture.

27. The installation of claim 26, wherein the first and second gaskets both occupy exterior positions.

28. The installation of claim 26, wherein one of the gaskets occupies an interior position, its opposite strip being removed to allow the gasket to closely abut a third gasket which is conformed to properly engage with and fit with a third fixture.

29. The installation of claim 26, wherein the aperture is slightly undersized relative to the fixture member, the gasket being made of material sufficiently flexible such that the gasket can engage snugly with the fixture member.

30. The installation of claim 29, the gasket material further being thermally insulating and impervious to a fluid.

31. The installation of claim 29, the gasket material being a porous elastomer.

32. The installation of claim 31, wherein the porous elastomer has closed porosity.

33. The installation of claim 31, wherein the elastomer is polyethylene.

* * * * *